United States Patent [19]
Jansen

[11] Patent Number: 5,850,674
[45] Date of Patent: Dec. 22, 1998

[54] SMOOTH BAND CLAMP WITH MOVABLE LOCKING ELEMENT

[75] Inventor: George A. Jansen, Denver, Colo.

[73] Assignee: Band-It-IDEX, Inc., Denver, Colo.

[21] Appl. No.: 711,255

[22] Filed: Sep. 9, 1996

[51] Int. Cl.$^6$ .................................................. B65D 63/08
[52] U.S. Cl. ................................ 24/21; 24/25; 29/525.01
[58] Field of Search ................................ 24/20 R, 21, 25, 24/268, 136 A, 115 L, 488; 29/525.01

[56] References Cited

U.S. PATENT DOCUMENTS

| | | | |
|---|---|---|---|
| 19,709 | 3/1858 | Olmstead | 24/25 |
| 25,125 | 8/1859 | Knowles . | |
| 43,494 | 7/1864 | Hanvey | 24/25 X |
| 51,214 | 11/1865 | Quant | 24/25 |
| 134,052 | 12/1872 | Gurley | 24/25 |
| 188,669 | 3/1877 | Pollard . | |
| 196,432 | 10/1877 | Chapman . | |
| 204,965 | 6/1878 | Gilman . | |
| 296,686 | 4/1884 | Gresham | 24/25 |
| 980,700 | 1/1911 | Swafford . | |
| 1,772,678 | 8/1930 | Newton | 24/25 |
| 4,366,602 | 1/1983 | Conlon et al. | 24/25 |
| 5,291,637 | 3/1994 | Meyers | 24/25 |
| B1 4,366,602 | 5/1994 | Conlon et al. | 24/25 |

FOREIGN PATENT DOCUMENTS

| | | |
|---|---|---|
| 2 044 175 | 8/1971 | France . |
| WO82/02035 | 6/1982 | WIPO . |

OTHER PUBLICATIONS

Brian, J. Hogan, "Ball–Locking system secures stainless steel tie", *Design News* Apr. 6, 1981.

*Primary Examiner*—James R. Brittain
*Attorney, Agent, or Firm*—Sheridan Ross, P.C.

[57] ABSTRACT

A clamping device is provided in the form of a smooth band, cooperating buckle and locking element. The band has a first end which engages the buckle and a second or free end which is positioned about the object or objects to be bundled and passes through the buckle to create overlapping portions of the band within the buckle. The locking element is positioned within the buckle and between the overlapping portions of the band to secure both portions of the band against adjustment of the band periphery.

24 Claims, 7 Drawing Sheets

SMOOTH BAND CLAMP WITH MOVABLE LOCKING ELEMENT

FIELD OF THE INVENTION

The present inventions relates to a clamping device for various objects and, in particular, to a smooth band clamp and movable locking element for constraining various kinds of cable.

BACKGROUND OF THE INVENTION

A number of clamping devices exist for a variety of applications. Recent applications utilize band clamps to bundle electrical cabling and rigid bars in power plants, chemical plants and numerous industrial settings. In some instances, the bands have interlocking teeth and complementary slots, and in other instances, the bands are smooth and utilize a wedge type locking element. In these later embodiments, the particular band clamp is subject to instability due to slippage of the band relative to the locking element or a twisting torque which can result in slippage and loosening. In addition, band clamps of this type are limited in ability to achieve or attain as small a periphery or circumference. Where a small periphery is desired, the physical dimensions of the buckle are often a limiting factor.

In several existing clamping or bundling devices, a smooth band is looped through a buckle in an overlapping manner and a locking element is utilized to secure the overlapping band in a desired periphery within the buckle. Typically, the locking element is positioned on top of two overlapping portions of the band. This arrangement allows the band to move relative to itself which allows the periphery of the band to increase, thereby releasing the previously secured items. In other existing devices, a locking ball is utilized within the buckle to secure the overlapping band portions at a desired periphery. In such devices, the ball engages the inside surface of the top of the buckle and the upper surface of the upper band of the overlapping band portions. Because the locking element is a sphere, it only engages the inside of the buckle and the upper band portion at its circumference. This greatly reduces the quantity of surface engaged for purposes of securement. Moreover, in those instances where a sphere is utilized, the height of the buckle is increased in order to accommodate a larger diameter sphere and increase the available circumferential lengths for contact with the band. However, this results in increased buckle size and further increases the likelihood that the buckle will experience twisting torque.

SUMMARY OF THE INVENTION

A clamping device is provided that includes an elongated smooth band, a buckle for facilitating adjustment of the band periphery about the particular objects to be clamped, and a locking bar to secure the desired band periphery. A pair of raised dimples are positioned proximate one end of the band. One dimple acts to retain the locking element. The second dimple assists passage of the band through the buckle.

The buckle generally comprises a pair of opposed side walls, a base and a top which cooperate to define an open front and back and an inner passage way or channel through the buckle. The top is generally inclined from front to back relative to the base. The top includes a raised central portion which defines a pair of shoulders adjacent the opposed side walls.

The first end of the band is inserted into the buckle and positioned with a retaining tab abutting the base along the front opening of the buckle. The retaining tab prevents the first end of the band from moving through the buckle during tightening of the band periphery. A locking element or cylindrical locking bar is positioned between the pair of dimples. The second or distal end of the smooth band is positioned around the circumference of the items to be clamped and inserted through the front opening of the buckle. The forward most dimple acts as a ramp or deflector to move the second end of the band over the top of the locking element and out of the opening at the back end of the buckle. Further movement of the second end of the band relative to the buckle adjusts the periphery of the band. Once the desired periphery is attained, release of the second end of the band, in combination with the outwardly directed expansion forces acting on the band by the clamped objects, causes the second or free end of the band to retract slightly into the buckle. This movement of the band further causes the locking element to move toward the front end of the buckle. The locking element separates the overlapping band portions and forces the upper band portion against the internal surfaces of the shoulders of the buckle and also forces the lower band portion against the base of the buckle to lock the overlapping band portions in the desired band periphery.

The dimples positioned proximate the first end of the band add rigidity to the first end of the band. This rigidity creates a beneficial upward bias or flex in the band as it is looped through the buckle and its periphery tightened. In this manner, an upward spring force is created which further assists in frictional engagement of the locking element relative to the buckle and securement of the band periphery.

In another embodiment, the internal surface of the top of the buckle has two or more segments inclined at different angles. Utilization of different slopes or degrees of incline promotes movement of the locking element and securement of the band periphery, while reducing the amount of band movement and periphery expansion prior to securement.

In another embodiment, the inner edge of the back end of the buckle top acts as a cutting surface to shear the band at its desired length. In this manner, the second end of the band retracts into the buckle as the locking bar moves into its locked position. As a result, the sharp edge of the cut band is not exposed and persons working near the clamp are not exposed to an unsafe risk.

It is therefore an object of the present invention to provide an improved smooth band clamp for securing bundled items.

It is an object of the present invention to provide an improved band clamp which utilizes a locking element positioned between overlapping band portions and with increased surface contact between the locking element and the corresponding buckle.

It is another object of the present invention to provide an improved buckle for use with a smooth band clamp which reduces the overall profile of the buckle allowing for a smaller periphery and also reducing twisting torque.

It is a further object of the present invention to provide an improved buckle for use in combination with a smooth band clamp that includes a cutting edge to shear the excess length of band.

It is yet another object of the present invention to provide a band for use in combination with a clamping device which during tightening of the band provides a biased spring force relative to the locking element and buckle to enhance securement.

Other objects and advantages of the invention will become apparent upon reading the following detailed

DETAILED DESCRIPTION OF THE INVENTION

The relationship and workings of the various elements of the invention will be better understood by the following detailed description. However, the embodiment of the invention described below is by way of example only and Applicant does not limit himself to the embodiment described. Furthermore, one should understand that the drawings are not to scale and that the embodiments are illustrated by graphic symbols and fragmentary views. In certain instances, the Applicant may have omitted details which are not necessary for an understanding of the present invention, such as conventional details of fabrication and assembly.

Figure 1:
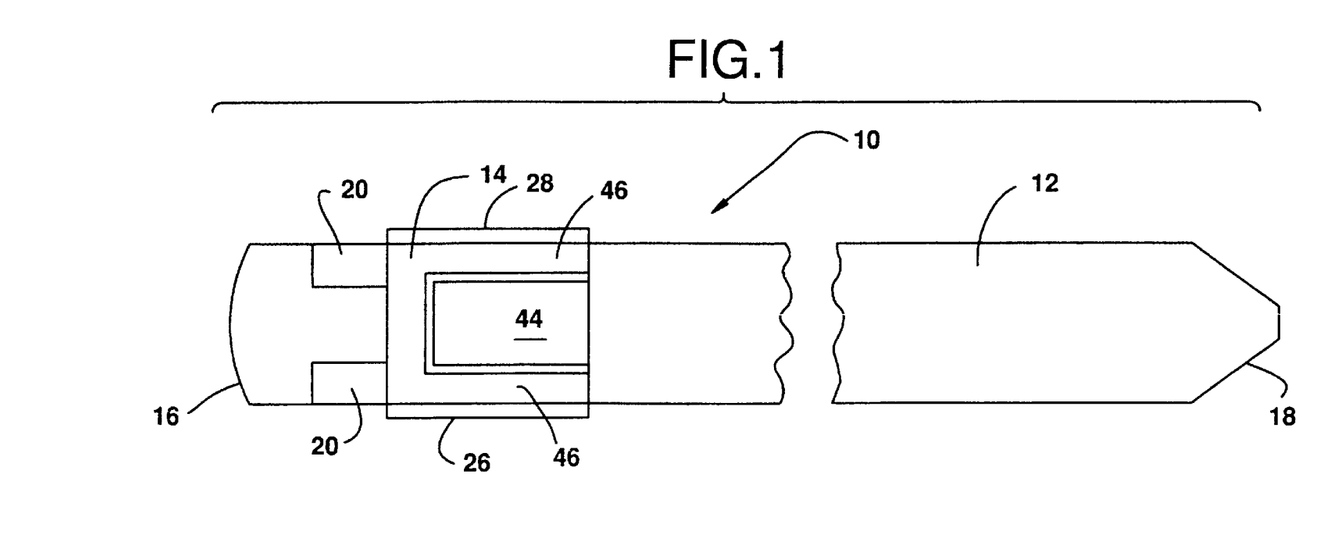
FIG. 1 is a top plan view of the clamping device of the present invention.
Figure 2:
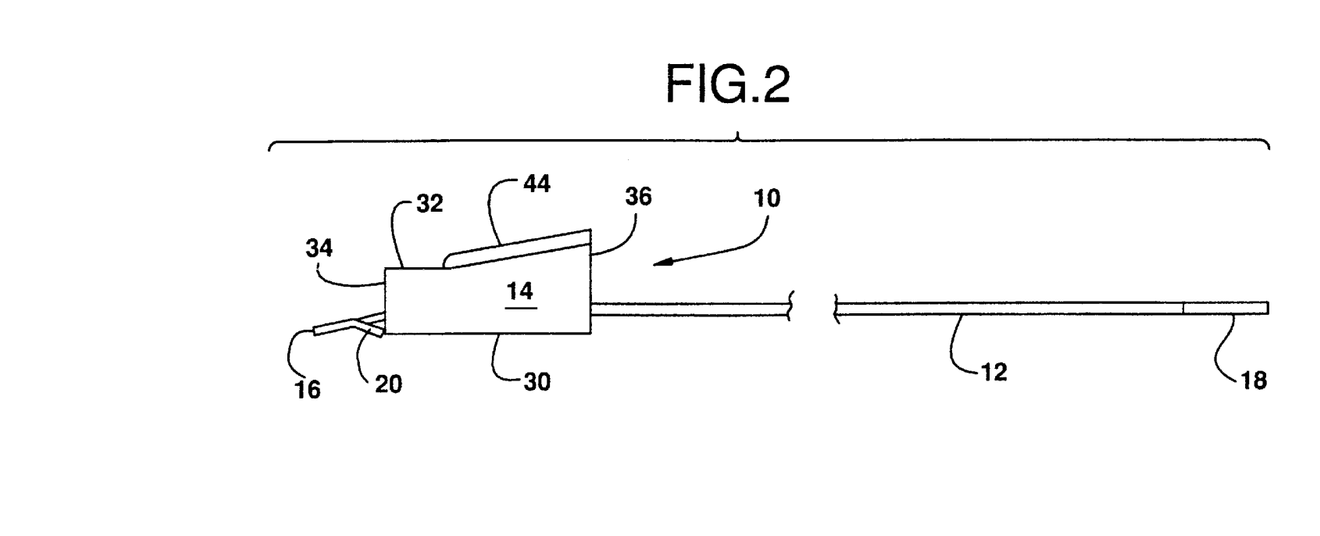
FIG. 2 is a side elevational view of the clamping device of the present invention.
Figure 3:
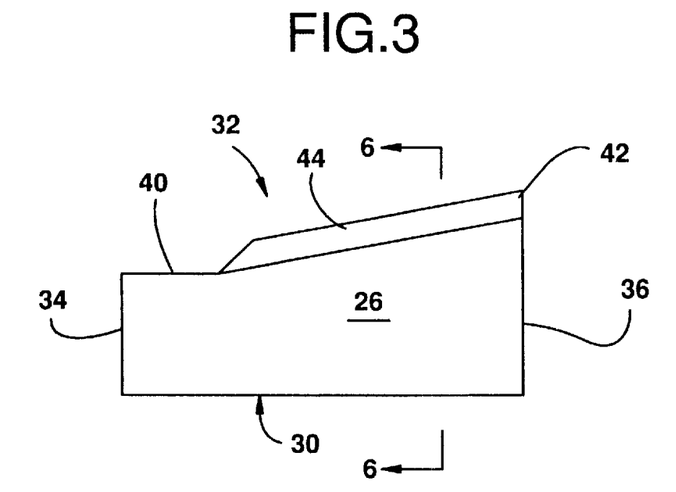
FIG. 3 is a side elevational view of one embodiment of the buckle of the present invention.
Figure 4:
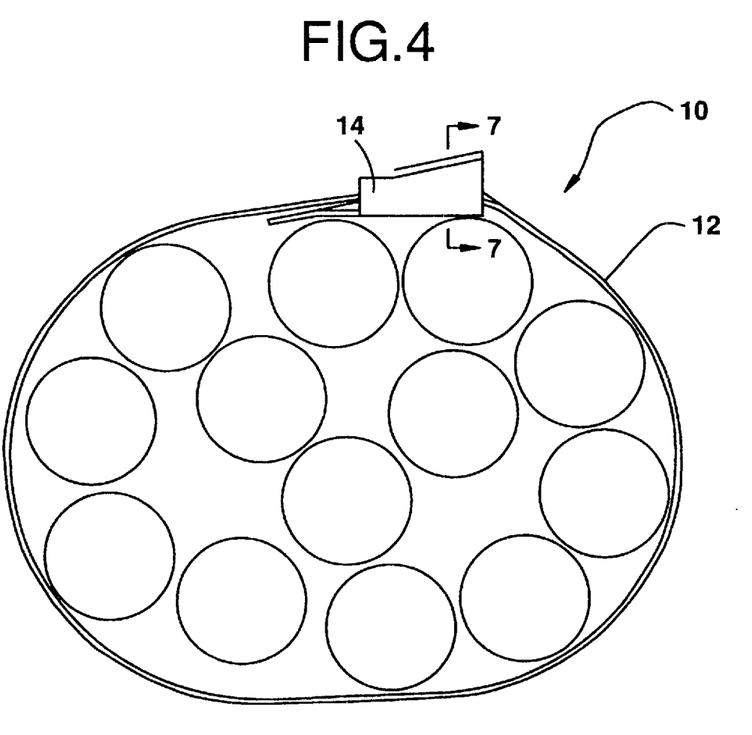
FIG. 4 is a front elevational view of the clamping device of the present invention bundling a group of cables.
Figure 5:
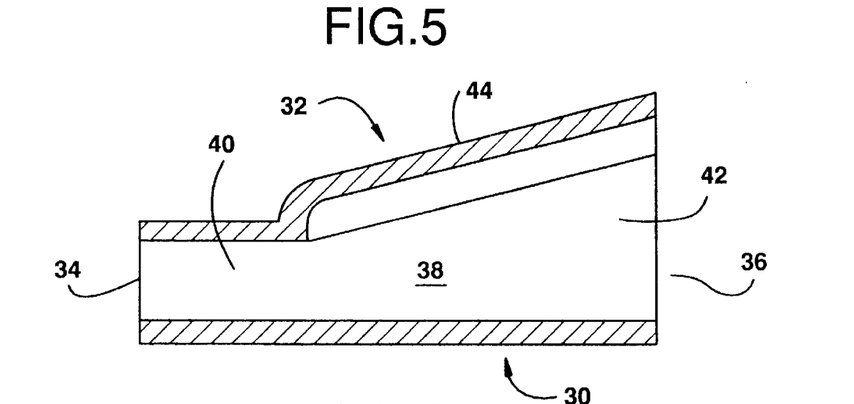
FIG. 5 is a cross-sectional view of one embodiment of the buckle of the present invention.

Referring to FIGS. 1, 2 and 4, the clamping device of the present invention is shown partially assembled. The clamping device 10 includes a substantially continuous, smooth band or strap 12 and a buckle 14 independent thereof. The band or strap 12 has a first and second end 16, 18. The first end 16 further includes a pair of buckle retaining dimples 20 for abutting the front or leading edge of the buckle 14 to prevent relative movement of the first end of the band relative to the buckle during tightening of the band. The first end 16 of the band 12 further includes a band guide dimple 22 and a locking element retaining dimple 24. The buckle retaining dimples 20, band guide dimple 22 and locking element retaining dimple 24 may be directly pressed into the band stock or formed by other means known in this art. In this manner, the various dimples retain structural integrity when subjected to the forces inherent in the clamping process and can provide a beneficial rigidity to the first end 16 of the buckle 14.

Figure 6:
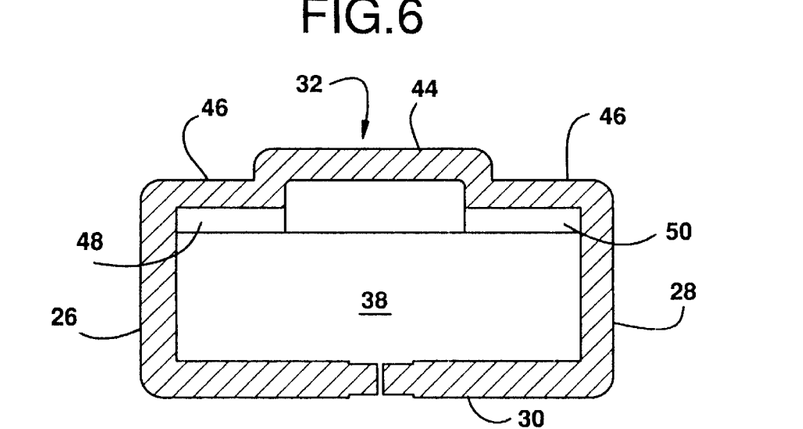
FIG. 6 is a cross-sectional view of one embodiment of the buckle of the present invention taken along line 6—6 of FIG.
Figure 7:
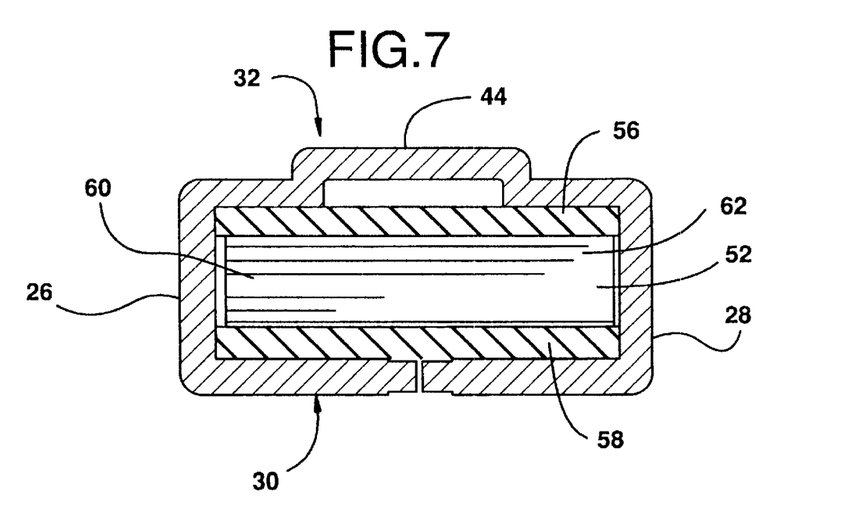
FIG. 7 is a cross-sectional view of one embodiment of the buckle of the present invention taken along line 7—7 of FIG. 4.

Turning to FIGS. 3 and 5–7, the buckle 14 comprises two opposed side walls 26, 28, a base 30 and a top 32 which define a buckle front 34, back of the buckle 36 and a passage way or channel 38 therebetween. The top 32 further includes a forward portion 40 which is in a plane parallel to the base 30, and a rearward portion 42 which is in a plane positioned at an inclined angle relative to the base 30. The rearward portion 42 further includes a raised center portion 44 which defines a pair of shoulders 46 adjacent the side walls 26, 28. Internal to the buckle 14, the shoulders 46 provide a pair of inclined surfaces 48, 50 (FIG. 6). The passage 38 has a size and shape sufficient to receive simultaneously two overlapping portions of the band 12.

As seen in FIGS. 7 and 10–15, the locking element 52 of the preferred embodiment is cylindrical in shape. The locking element 52 is positioned forward of this locking element retaining dimple 24 which precludes the locking element 52 from exiting the buckle 14. Where the locking element is adjacent the retaining dimple 24, in its rearward most position, sufficient space exists above the locking element 52 to allow the band 12 to pass over it and exit the back side 36 of the buckle 14. When the locking element 52 moves to its forward most position, FIG. 13, the overlapping portions 56, 58 of the band 12 are pressed against the inclined surfaces 48, 50 and the base 30 to secure the bands in a locked position.

Figure 10:
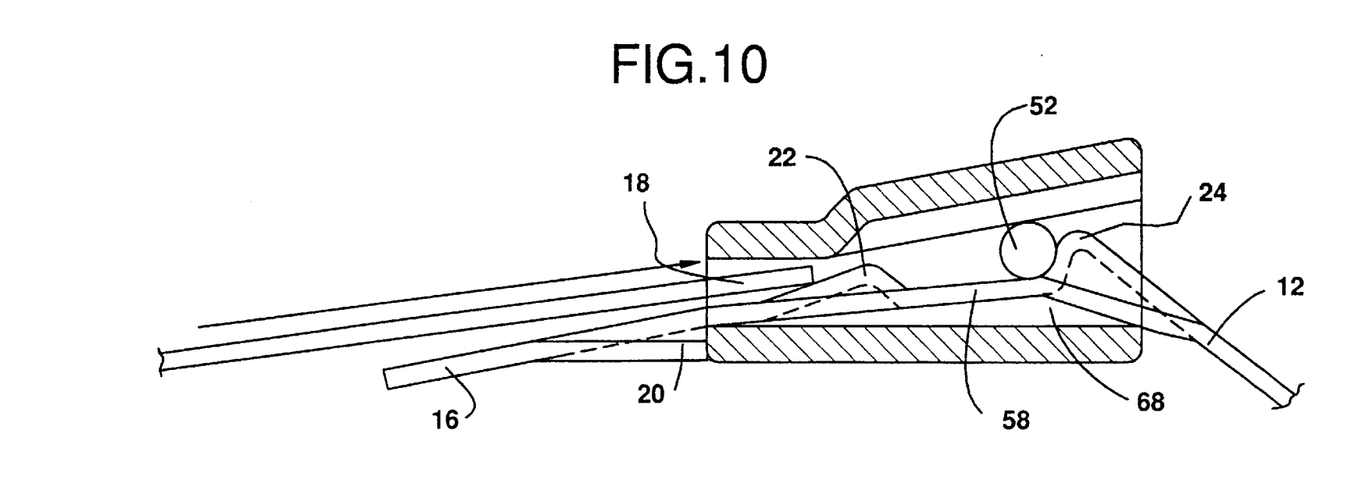
FIG. 10 is a partial cross-sectional view of the clamping device showing the second end of the smooth band entering the buckle and deflecting over the band guide dimple.
Figure 11:
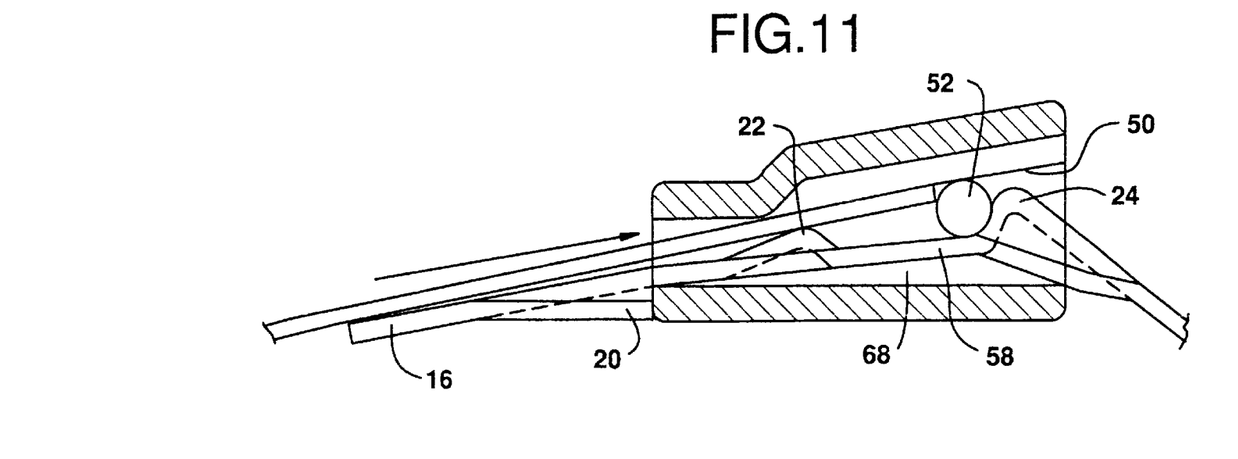
FIG. 11 is a partial cross-sectional view of the clamping device showing the second end of the smooth band passing further through the buckle.
Figure 12:
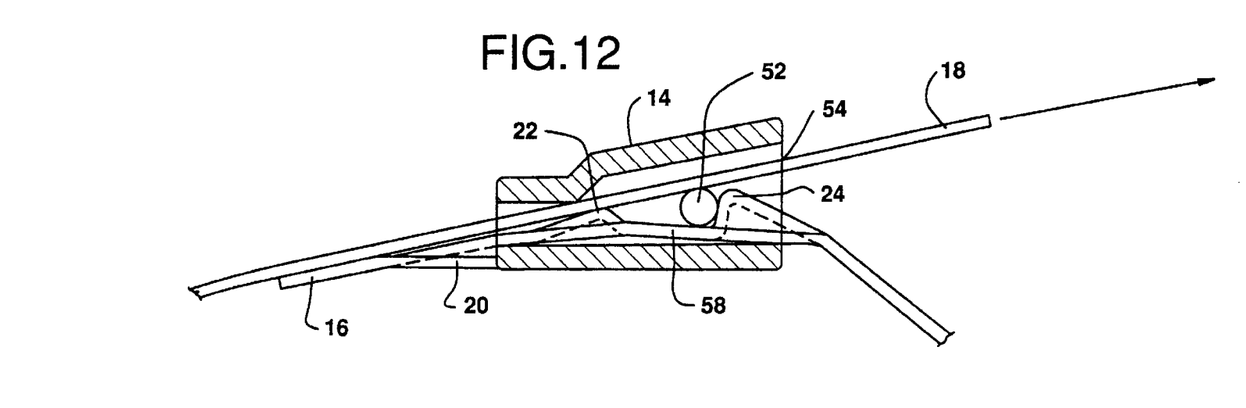
FIG. 12 is a partial cross-sectional view of the clamping device showing the second end of the smooth band passing over the locking element and exiting the buckle.
Figure 13:
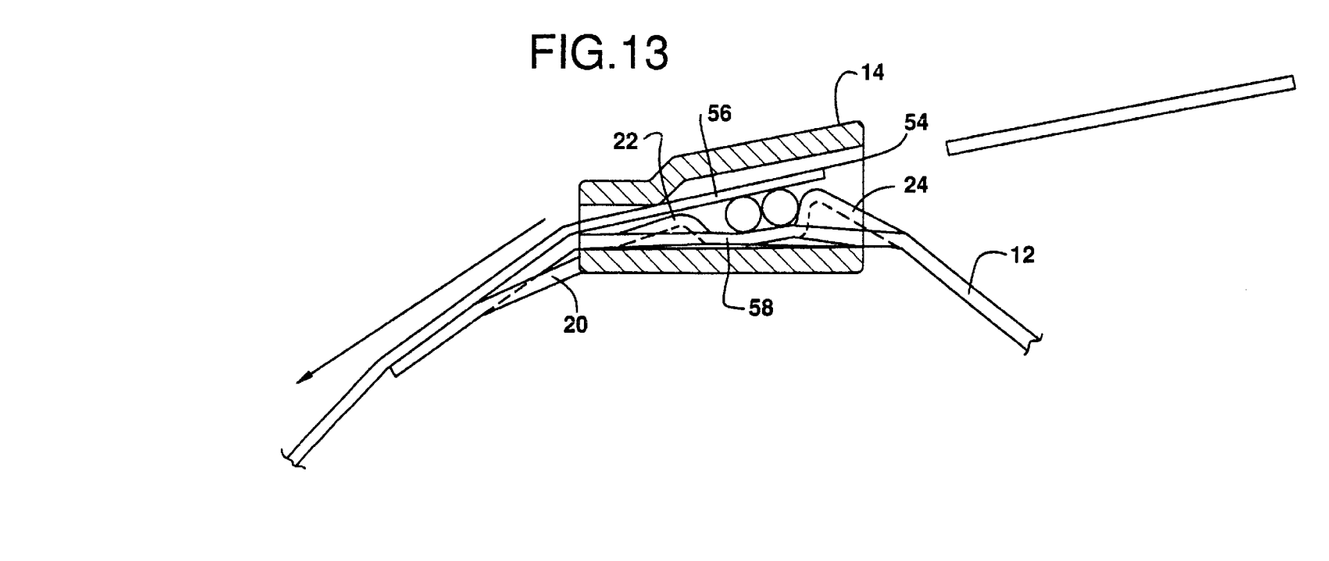
FIG. 13 is a partial cross-sectional view of the clamping device showing the second end of the smooth band retracting into the buckle after it has been cut to a desired length.

In an alternative embodiment, the portion of the band 12 adjacent the first end 16 can be constructed with increased rigidity to create a beneficial bias or spring effect on the locking element 52. This bias accentuates the friction force applied by the locking element 52 against the overlapping portions 56, 58 of the band 12. The bias is most pronounced and advantageous during tightening of the band periphery. This effect is shown in FIGS. 10 and 11 as the gap 68 between the band 12 and the base 30. As the band 12 is tightened, its rigidity causes the band to flex about the front and rear edges of the buckle 14. Passing the upper portion of the band 56 over the locking element 52 deflects the locking element 52 and lower band portion 58 to increase the friction force applied on the band. The manner in which the band guide dimple 22 and the locking element retaining dimple 24 are formed in the smooth band clamp can be sufficient to create this bias. Other for creating the bias, known to those skilled in the art, are also acceptable.

The dimensions of the band 12, the buckle 14 and the locking element 52 depend upon the size and shape of the object to be clamped and the compressive force to be exerted on the object by the clamping device 10. The width of the band 12 is preferably at least 0.187 inch and the thickness is preferably at least 0.01 inch. The length of the band 12 is sufficient to wrap about the object being constrained and provide a free end for tightening the periphery of the band. The material is preferably 316 stainless steel, quarter hard.

In the preferred embodiment, the buckle material is also 316 stainless steel, quarter hard. The thickness of the material is 0.02 inch and the length of the base is 0.25 inch. The front opening is 0.037 inch and the height of the back opening, measured from the base 30 to the inclined surfaces 48,50 at the rearward end 36 of the top 32, is 0.070 inch.

The locking element 52 is preferably made from 0.031 inch diameter 316 stainless steel wire, fully hardened. The locking element 52 used in conjunction with the band 12 and buckle 14, having the dimensions described in the preceding paragraphs, would have a length of approximately 0.187 inch.

While the composition of the band 12, buckle 14 and locking element 52 is preferably the same, namely, 316 stainless steel, it is understood that each can be composed of other suitable metals or metal alloys, or plastics.

Referring to FIGS. 10–13, to clamp an object or group of objects, the first end 16 of the band 12 is inserted partially into the buckle 12, leaving the locking bar retaining dimple 24 extending outside of the back end 36 of the buckle. The locking element or bar 52 is then placed on top of the band 12 forward of the locking bar retaining dimple 24. The first end 16 of the band 12 is then moved through the buckle 14 until the retaining dimples 20 clear the opening at the front 34 of the buckle 14 and engage the base 30 of the buckle 14 and the band guide dimple 22 and locking bar retaining dimple 24 are positioned inside the passage way 38 of the buckle 14.

A loop in the band 12 is formed by inserting the second end 18 of the band into the passage 38 of the buckle 14. The second end 18 contacts the band guide dimple 22 and is deflected over the band guide dimple 22 and the locking bar 52 and along the inclined surfaces 48, 50. When the band 12 reaches the desired periphery, any excess length of band may be cut away. In the preferred embodiment, the inside edge 54 along the top of the buckle 14 shears the excess band. Once cut, the expansion forces acting on the band 12 by the items being clamped cause the band 12 to retract into the buckle 14 due to expansion of the band periphery. Simultaneously, the locking bar 52 will be drawn toward the front 34 of the buckle 14 and will secure the upper band portion 56 against the inclined surfaces 48, 50 of the buckle 14 and the lower band portion 58 against the base 30. In this regard, the locking element 52 directly contacts both overlapping band portions 56, 58 and forces each band portion against an inside surface of the buckle 14 to obtain a secure lock. In addition, the locking element creates a uniform and balanced application of pressure on the band portions 56, 58. This pressure is applied substantially along the width of band portion 56 which abuts the base 30, and along at least the lateral portions 60, 62 of the locking element 52 as a result of the band 12 contacting the inclined surfaces 48, 50.

Figure 8:
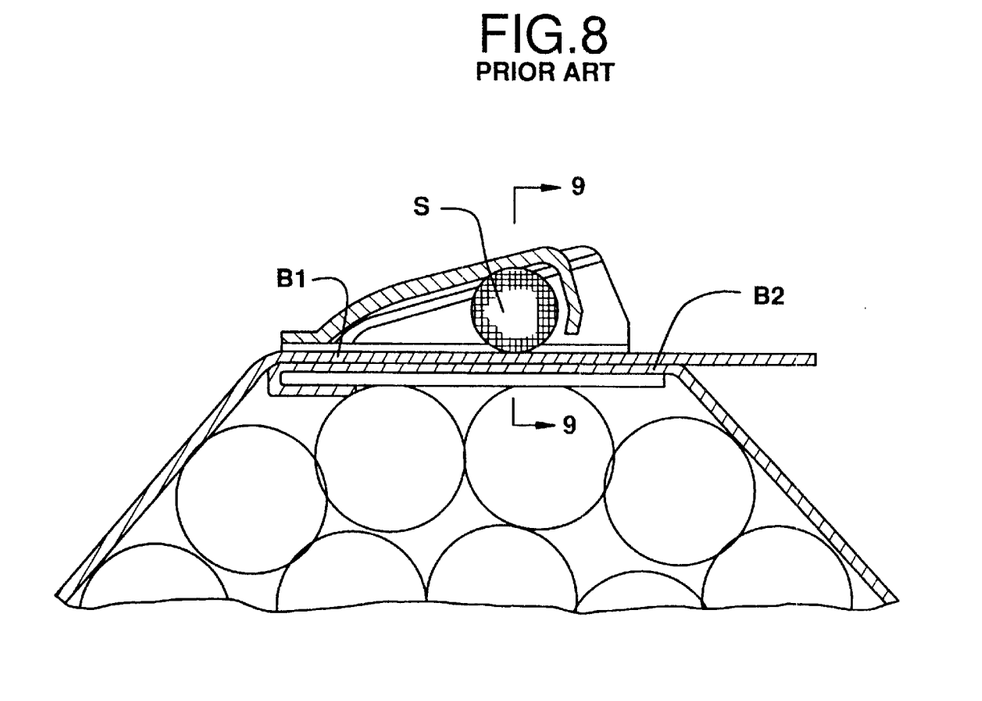
FIG. 8 is a cross-sectional view of a prior art clamping device.
Figure 9:
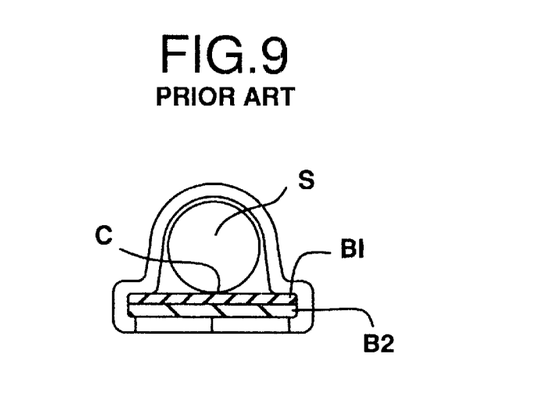
FIG. 9 is a cross-sectional view of a prior art clamping device taken along line 9—9 of FIG. 8.

In comparison to prior art devices, FIGS. 8 and 9, the present invention provides increased surface area contact between the locking element 52, the overlapping band portions 56, 58 and the buckle 14. In the depicted prior art device, a sphere S is utilized as the locking element, but it is not positioned between the overlapping band portions. Rather, it is positioned on top of both overlapping band portions B1, B2. As a result, one of the overlapping band portions B2 is not in contact with the locking element, and the other overlapping band portion B1 is in contact with the locking element S only along a small portion of the circumference C of the sphere S. Applicant's advantage creates an improved clamping device with enhanced band securement.

Figure 14:
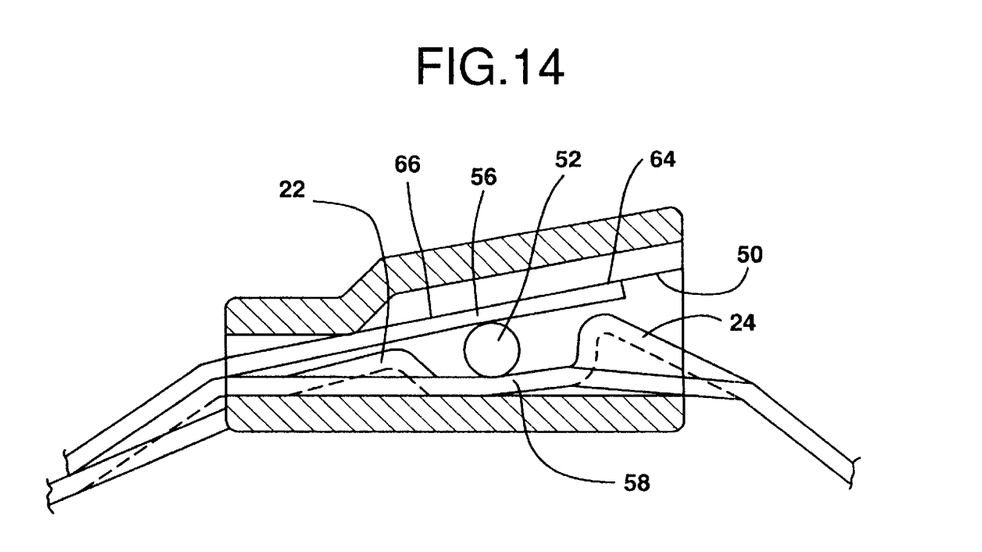
FIG. 14 is a partial cross-sectional view of one embodiment of the clamping device of the present invention showing a buckle with an upper internal surface inclined at two different angles to provide greater contact with the band.
Figure 15:
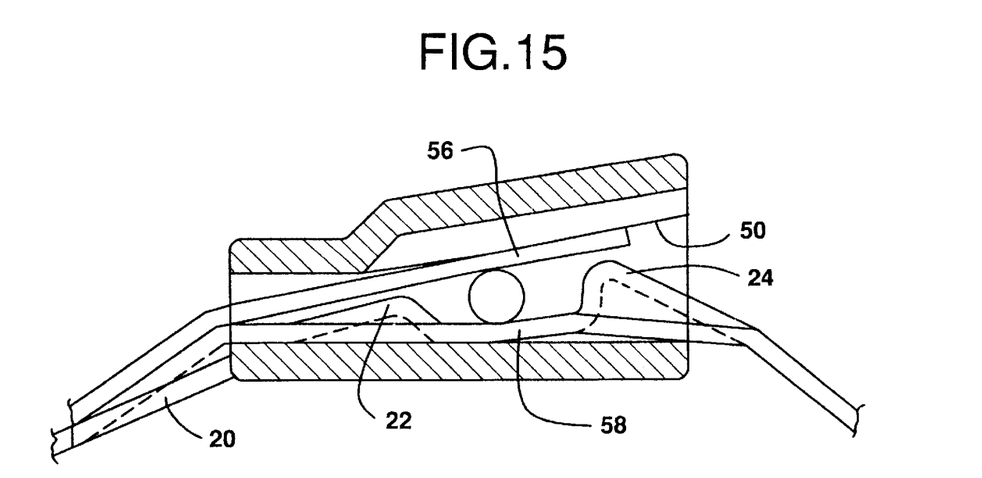
FIG. 15 is a partial cross-sectional view of a second embodiment of the clamping device of the present invention showing a buckle with an upper internal surface inclined at a single angle.

As depicted in FIGS. 14 and 15, the inclined surfaces 48, 50 on the inside of the buckle 14 may be designed at a single, shallow angle, such as 10° (FIG. 14), or may be constructed at two separate angles (FIG. 15). In the FIG. 14 embodiment, when the second end 18 of the band 12 is released, the expansion forces created by the objects being clamped try to expand the band periphery. In so doing, the second end 18 of the band 12 withdraws into the buckle moving the locking element into locking engagement with the overlapping band portions 48, 50. Understandably, the greater distance the second end 18 of the band withdraws, the more the band periphery expands and loosens. The distance can be minimized using an inclined surface disposed at least at two different angles. In the FIG. 15 embodiment, a first inclined surface 64 at an angle of 10 degrees and a second inclined surface 66 at an angle of 12.5 degrees, is shown. The steeper second angle shortens the distance the band withdraws into the buckle 14 and, therefore, shortens the distance the locking element 52 moves. This also reduces expansion of the band after release of the second end 18.

The fact that the present invention has been described with reference to particular embodiments does not mean that other embodiments do not exist. It should be appreciated that many other embodiments can be provided within the spirit and scope of this invention.

What is claimed is:

1. A clamping device having a band and cooperating buckle for facilitating securement of a band periphery, comprising:

band having a first end and a second end;

a buckle positioned on said band, having a passage extending therethrough of a size and shape sufficient to receive said band;

locking means disposed within said buckle and between overlapping portions of said band to effectuate securement of the band periphery;

wherein said buckle has a base, opposed side wells and a top defining said passage, said top and side walls adjoining to define internal shoulder portions such that said locking means secures said overlapping portions of said band against said base and said shoulder portions.

2. A clamping device of claim 1 wherein the locking means engages overlapping portions of said band substantially along the entire width of said band.

3. A clamping device of claim 2 wherein said locking means comprises a cylinder.

4. A clamping device of claim 1 wherein said band includes a retaining means to prevent said first end of said band from passing through said buckle during tightening of the band periphery.

5. A clamping device of claim 1 wherein said band includes a retaining means to prevent said locking means from exiting said buckle.

6. A clamping device of claim 1 wherein said locking means is movable between a first position which allows for band periphery adjustment, and a second position which prevents band periphery adjustment.

7. A clamping device of claim 1 wherein a portion of said band within said buckle is biased to urge said locking element into contact with a second portion of said band within said buckle.

8. A clamping device having a band and cooperating buckle for facilitating securement of a band periphery, comprising:

a band having a first end and a second end;

a buckle positioned on said band, having a passage extending therethrough of a size and shape sufficient to receive said band;

locking means disposed within said buckle and between overlapping portions of said band to effectuate securement of the band periphery;

wherein said band includes a band guide disposed proximate said first end to assist placement of said second end over said locking means.

9. A clamping device having a band, a cooperating buckle and a locking element for facilitating securement of a band periphery, comprising:

the band having a first end and a second end, said first end including buckle retaining means to prevent said first end from moving through said buckle;

a raised portion disposed on said band proximate said first end for preventing movement of the locking element in a direction toward said second end;

the buckle positioned on said band and having a passage extending therethrough of a size and shape sufficient to receive said band;

the locking element positioned on said band between said raised portion and said first end, said locking element movable towards and away from said raised portion;

wherein, when said locking element is adjacent said raised portion, said band periphery is adjustable by inserting said second end of said band through said buckle and over said locking element to said desired band periphery, and when said desired band periphery is attained, said second end of said band is released and retracts relative to said buckle to cause said locking element to move away from said raised portion and to secure movement of said band against further periphery adjustment.

10. A clamping device of claim 9 wherein said buckle has a base, opposed side walls and a top defining said passage, said top and side walls adjoining to define internal shoulder portions such that said locking means secures said overlapping portions of said band against said base and said shoulder portions.

11. A clamping device of claim 9 wherein said first end has a free end and said buckle retaining means comprises a dimple disposed on said band proximate said first end but spaced from said free end thereof.

12. A clamping device having a band and cooperating buckle for facilitating securement of a band periphery, comprising:

a band having a first end and a second end;

a buckle positioned on said band, having a passage extending therethrough of a size and shape sufficient to receive said band;

said band at least partially overlapping itself within said buckle;

locking means disposed within said buckle and in contact with both overlapping portions of said band to effectuate securement of the band periphery;

wherein said band includes a band guide disposed proximate said first end to assist placement of said second end over said locking means.

13. A clamping device of claim 12 wherein the locking means engages overlapping portions of said band substantially along the entire width of said overlapping band portions.

14. A clamping device of claim 13 wherein said locking means comprises a cylinder.

15. A clamping device of claim 12 wherein said band includes a retaining means to prevent said first end of said band from passing through said buckle during tightening of the band periphery.

16. A clamping device of claim 12 wherein said band includes a retaining means to prevent said locking means from exiting said buckle.

17. A clamping device of claim 12 wherein said locking means is movable between a first position which allows for band periphery adjustment, and a second position which prevents band periphery adjustment.

18. A clamping device of claim 12 wherein a portion of said band within said buckle is biased to urge said locking means into contact with a second portion of said band within said buckle.

19. A method for clamping an object or group of objects, comprising:

providing a band having a first end and a second end;

providing a buckle having a base, top and opposed side walls and a passage extending through, said passage of a size and shape sufficient to receive therein said band;

providing a locking element;

positioning said buckle on said band;

positioning said locking element on said band and within said buckle wherein said locking element can move between a first position and a second position;

placing a band guide adjacent said first end of said band to facilitate moving said second end of said band over said locking element;

locating said band, said buckle and said locking element adjacent an object to be clamped;

placing said first end of said band around said object, through said buckle and over said locking element to define an overlapping portion of said band with said locking element disposed therebetween;

adjusting a periphery of said band through said buckle to its desired tightened position, wherein said locking element is in said first position until said band is adjusted to a desired periphery; and, releasing said first end of said band, wherein said locking element moves to said second position to secure said band at the desired periphery.

20. The method of claim 19 further comprising providing a locking element which is substantially cylindrical in shape.

21. The method of claim 19 further comprising providing a locking element which is substantially the same width as said band.

22. The method of claim 19 further comprising engaging said overlapping band portions substantially along the width of each with said locking element.

23. The method of claim 19 further comprising providing a retaining member proximate said first end of said band to prevent movement of said first end relative to said buckle during tightening of said band periphery.

24. The method of claim 19 further comprising providing a retaining member to prevent movement of said locking element out of said buckle.

* * * * *